United States Patent [19]
Pizzuti

[11] 4,338,008
[45] Jul. 6, 1982

[54] SWITCHING ARRANGEMENT FOR AUTOMATICALLY EFFECTING SELECT PHOTOGRAPHIC FUNCTIONS

[75] Inventor: Donato F. Pizzuti, Lynnfield, Mass.
[73] Assignee: Polaroid Corporation, Cambridge, Mass.
[21] Appl. No.: 214,476
[22] Filed: Dec. 9, 1980
[51] Int. Cl.³ .............................................. G03B 7/24
[52] U.S. Cl. ..................................................... 354/21
[58] Field of Search ...................... 354/21, 37, 41, 48, 354/58, 275, 28; 352/78 C, 92

[56] References Cited
U.S. PATENT DOCUMENTS
4,024,557 5/1977 Aoyama et al. ...................... 354/275

Primary Examiner—L. T. Hix
Assistant Examiner—William B. Perkey
Attorney, Agent, or Firm—Leslie J. Payne

[57] ABSTRACT

A photographic apparatus is disclosed having a sensing mechanism for adjusting automatic photographic functions of the apparatus in accordance with particular film characteristics of the film to be used. Included in the sensing mechanism is a plurality of sensing arrangements operable between different sensing states, which number of states is in excess of the number of sensing arrangements, responsive to different coding arrangements, on respectively different containers for effecting a select photographic function according to the film characteristics represented by the coding arrangement.

7 Claims, 7 Drawing Figures

SWITCHING ARRANGEMENT FOR AUTOMATICALLY EFFECTING SELECT PHOTOGRAPHIC FUNCTIONS

BACKGROUND OF THE INVENTION

This invention relates to the photographic field and, more particularly, to an improved apparatus for changing photographic functions of a camera in accordance with different film characteristics of the film used in the camera.

It is known to adjust automatically photographic functions of a camera in accordance with the characteristics of the film to be used. The following U.S. Patents are exemplary of known arrangements for adjusting such functions: Nos. 3,194,133; 3,422,740; 3,537,374; 3,963,333; 4,000,497; and 4,077,042. These camera apparatus have a chamber for receiving therein film containers having tactile coding structure thereon. The coding structure may take the form of protrusions, ribs, or notches and their size and/or position are representative of some film characteristic, such as film speed. Mechanisms in the chamber engage the coding structure responsive to insertion of the container. Such mechanisms then effect a select photographic function corresponding to the film characteristic. For example, one changes a filter setting. Another positions a stop member to limit shutter blade movement, while still others adjust operation of an exposure control circuit, or vary the output of the photoflash. In U.S. Pat. No. 3,194,133, a film camera is provided with a plurality of switches in a chamber which receives a film container. Each switch is positioned in the path of movement of different abutments provided on correspondingly different containers that are inserted in the chamber. Differently positioned ones of the abutments, representative of different film sensitivities or film speeds, will then actuate a correspondingly different switch for controlling exposure control in accordance with the film speed. There are, however, disadvantages with this arrangement. For instance, it is complicated since for each different film speed there is a requirement for a separate switch. Moreover, with such a complex arrangement, the switching operations are prone to malfunctioning. In U.S. Pat. No. 4,077,042, a single sensing member varies capacitance or resistance of an exposure circuit continously responsive to movement imparted by a coding structure. A drawback of this approach is that slight dimensional errors of the coding structure could mean that the capacitance or resistance values actually achieved are different from those desired.

SUMMARY OF THE INVENTION

According to the present invention, there is provided a photographic apparatus comprising means operable for effecting a photographic function, means for defining a chamber capable of receiving one of a plurality of selectively dimensioned film containers removably insertable therein. For sensing differently positioned coding arrangements carried on the containers, sensing means are provided. These coding arrangements are indicative of a particular characteristic of the film contained therein. Means responsive to the sensing means are provided for controlling the operable means so as to effect a select photographic function corresponding to the characteristic of the film.

In one illustrated embodiment, the sensing means includes a plurality of sensing arrangements operable between different sensing states which number of states is in excess of the number of sensing arrangements, responsive to different coding arrangements on respectively different film containers.

Among the objects of the invention are, therefore, the provision of an improved apparatus for effecting select photographic functions of a camera responsive to film characteristics of film contained within film containers usable with the camera; the provision of an improved apparatus for altering exposure control of the camera in accordance with the film speed contained within the film container; the provision of an improved film speed switching arrangement reliably providing for a plurality of film speed changes by a lesser number of switching arrangements.

Other objects and further scope of applicability of the present invention will become apparent upon reading the following detailed description when taken in conjunction with the accompanying drawings wherein like reference numerals indicate like parts throughout the several views.

DETAILED DESCRIPTION

Figure 1:
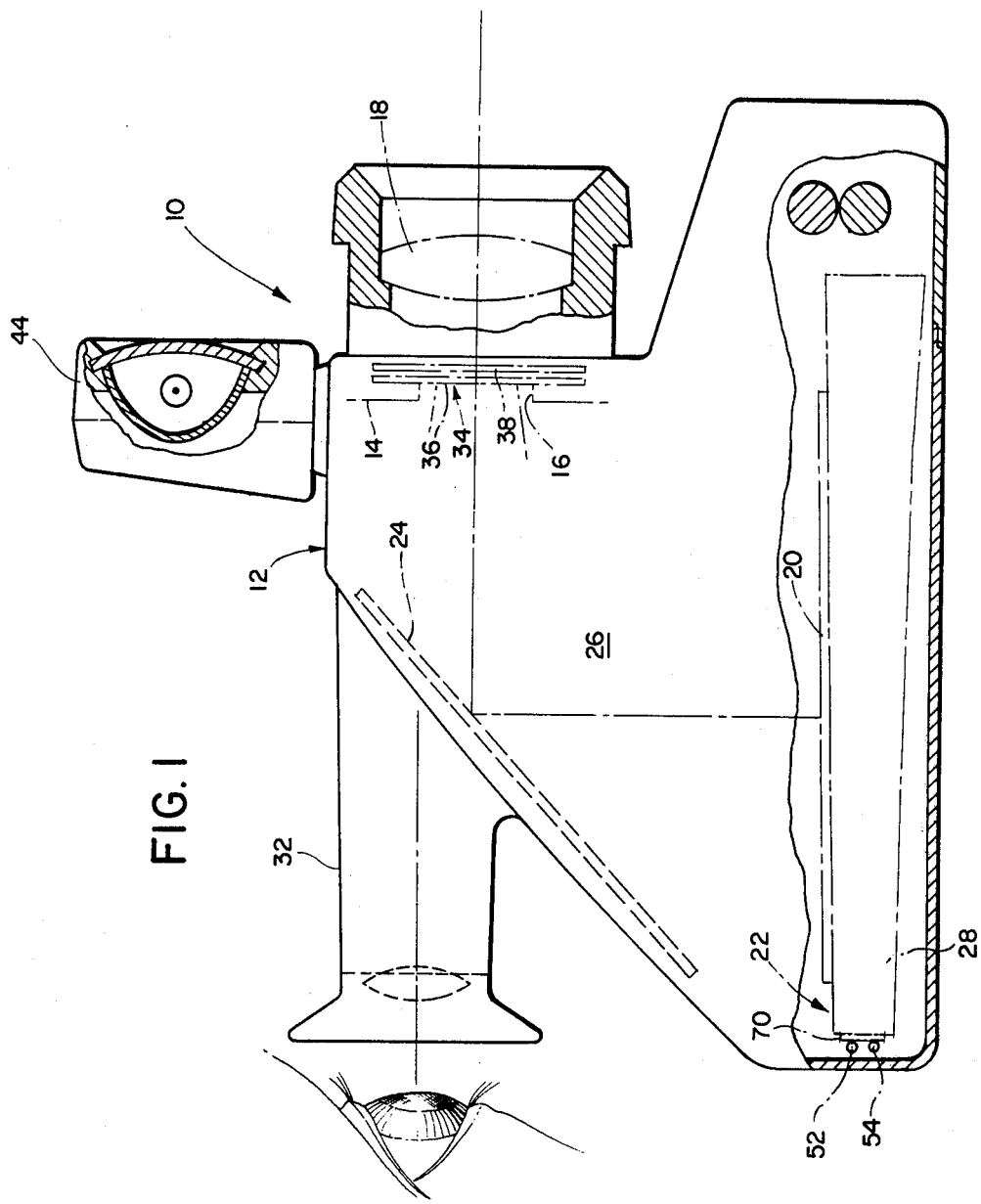
FIG. 1 is a side elevational view, partly in section, illustrating a photographic apparatus of the present invention.
Figure 2:
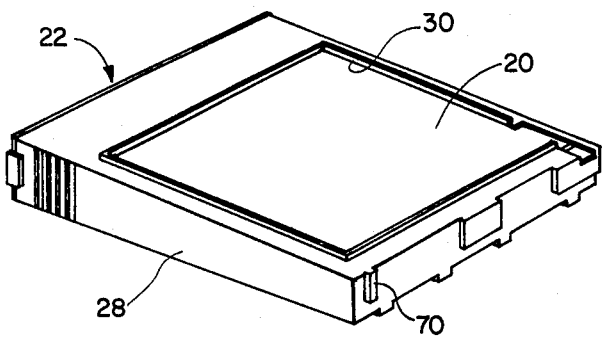
FIG. 2 is a perspective view of a film pack usable in such apparatus.

Referring to FIG. 1, there is shown generally at 10 a photographic camera apparatus. The camera includes a housing 12 having affixed therein a baseblock casting 14 for supporting various components of this apparatus. Disposed centrally within the casting 14 is a light entry exposure opening 16 defining the maximum available exposure aperture for the system. Provided in overlying relation to the light entry opening 16 is an objective or taking lens 18 for focusing image carrying rays that will pass through the light exposure opening 16. In this embodiment, the taking lens 18 may be of the fixed focus type. Of course, variable focus lens systems, in lieu of the fixed focus kind may be provided. It will be appreciated that image carrying rays emanating from the scene to be photographed are directed by the taking lens 18 rearwardly to a photographic film unit 20 housed within a film pack container 22 by way of a reflecting mirror 24. The reflecting mirror 24 is stationed in a suitable light-tight film exposure chamber 26. Each of the film units 20 of the film pack 22 is successively positioned at the focal plane of the camera 10. The film pack container 22 contains a generally rectangular housing 28 having a rectangular window 30 formed at the top end thereof. This opening permits the image forming rays reflected from the mirror 24 to reach the photosensitive material formed in each of the film units. Examples of such film packs, such as shown in FIG. 2, are described in greater detail in commonly assigned U.S. Pat. Nos. 3,543,662; 3,705,542; 3,748,484; 3,779,770; and 4,040,072.

Although the above apparatus is described for use in connection with a non-reflex type camera, the intended scope of this invention is by no means so limited. Accordingly, cameras of the well-known reflex type, such as described in U.S. Pat. No. 3,672,281, entitled "Reflex Camera", by E. H. Land, issued June 27, 1972, commonly assigned herewith may be equally suitable for embodying the improved switching arrangement of this invention.

Additionally, a viewing window (not shown) is located in the front face of the camera housing 12 and operates in conjunction with a viewing system 32 for permitting viewing and framing of the scene to be photographed.

Intermediate the objective taking lens 18 and the exposure opening 16 is a shutter blade mechanism generally indicated by reference numeral 34. This mechanism 34 has two overlapping shutter blade elements 36 and 38 of the so-called "scanning type". Such type is described more fully in commonly assigned U.S. Pat. No. 3,942,183, and incorporated by reference herein. Briefly, a pair of scene light admitting primary apertures (not shown) are provided in the blade elements 36, 38, respectively. During displacement of the blades 36, 38, the primary apertures operatively cooperate by being in an overlapping condition relative to the opening to define a progressive variation of effective aperture values. The position of the shutter blades 36, 38 is responsive to the light incident upon a light detecting station (not shown). Basically, the light detecting station cooperates with a pair of overlapping photocell apertures (not shown) on the blades for terminating exposure as a function of the time integration of the intensity of scene radiation incident upon a photocell (not shown) of such light detecting station.

The cooperation between the light detecting station, the shutter blades with primary and photocell apertures and a solenoid (not shown) used for controlling shutter blade displacement and thereby the exposure in the manner indicated above is not being described in detail, since it does not form, per se, an aspect of this invention. However, reference is being made to the last noted patent for a more detailed description thereof.

Reference is made to FIG. 1 for showing an electronic flash strobe 44 forming part of the photographic camera apparatus 10. The strobe 44 contributes a portion of the scene light admitted for exposing the film. Structure and operation of this strobe do not, per se, form an aspect of this invention. Therefore, details regarding them will not be discussed. However, reference is made to commonly assigned U.S. Pat. No. 4,104,653 for a more complete description thereof.

Referring back to the camera housing 12, it will be understood that access to the film pack receiving chamber is by virtue of a pivotal loading door (not shown). This door when opened permits insertion of the film pack 22 within the film pack receiving chamber as well as, of course, removal therefrom. Reference is made to copending and commonly assigned U.S. application Ser. No. 54,598 for a description of such a door and the manner in which it is operated.

Reference is now made to FIGS. 2–7 for a look at the improved film speed switching or sensing arrangement 48 of this invention. Included in this sensing arrangement 48 is a stationary common sensing or switching element or member 50 and two independently movable sensing or switching members 52, 54. The stationary element 50 is electrically connected to a source of electric power. In this embodiment, it is the battery contained in the film pack 22.

Each of the sensing members 52 and 54 is, preferably, defined by a thin, conductive, flexible material and each has two sensing states, respectively, which in combination provide four states of operation for the sensing arrangement 48. Also, the structural configuration of the sensing members 50–54 and their manner of cooperation provide a compact switching or sensing arrangement which can be easily accommodated into existing film pack receiving chambers. Towards this end, the common sensing member 50 includes an upstanding tang portion 50a which is positioned so as to be generally parallel to the container wall 28. Both the sensing members 52, 54 have generally U-shaped sections 52a, 54a, respectively, which are coplanar. These sections 52a, 54a are normally inherently biased into the closed condition with the sensing tang 50a and are at right angles thereto. A first state occurs when both the sensing members 52 and 54 are conducting or in other words when both are closed (FIG. 6); a second state is the inverse where the sensing members 52 and 54 are nonconducting (FIGS. 3 and 7); a third state is where the sensing member 52 is nonconducting and the sensing member 54 is conducting (FIG. 5); and finally, the fourth state is the inverse of the latter, namely the sensing member 52 is conducting and the sensing member 54 is nonconducting (FIG. 4).

Figure 7:
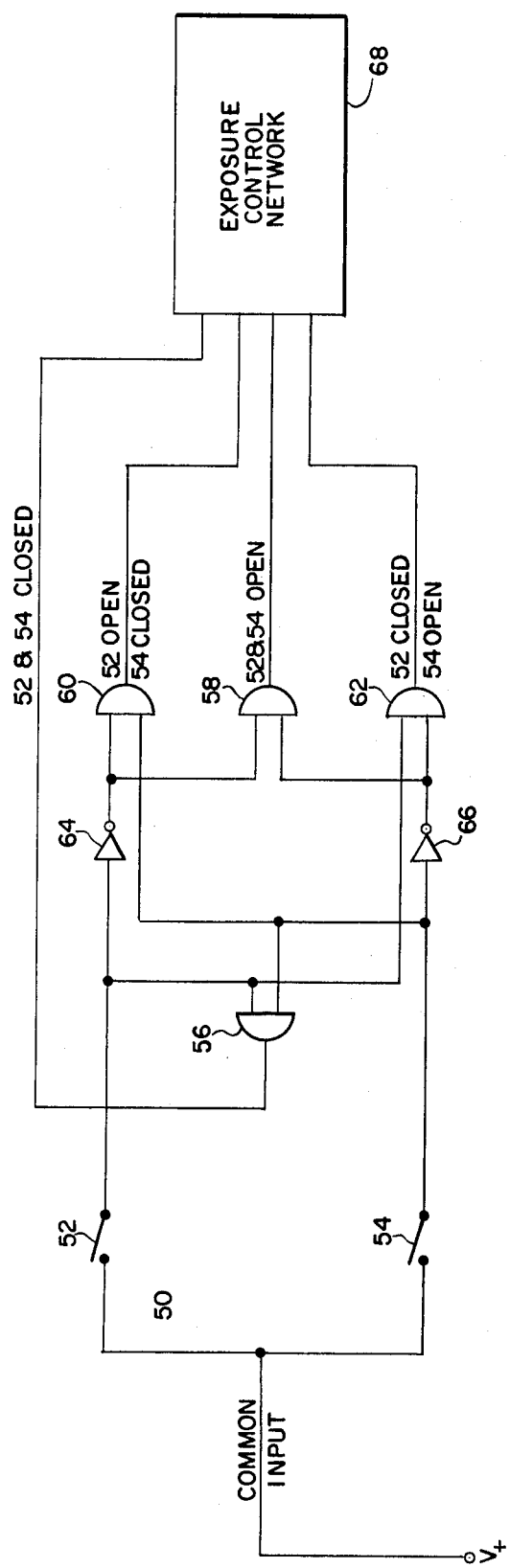
FIG. 7 is a block diagram.

Various logic circuits may be implemented to distinguish these four states. An exemplary circuit is shown in FIG. 7, comprising four conventional AND gates designated 56, 58, 60 and 62 and two inverters 64 and 66. The output of each of the AND gates 56–62 is coupled to a camera control system, for example, an exposure control network 68 which defines means for effecting a select photographic operation.

Figure 3:
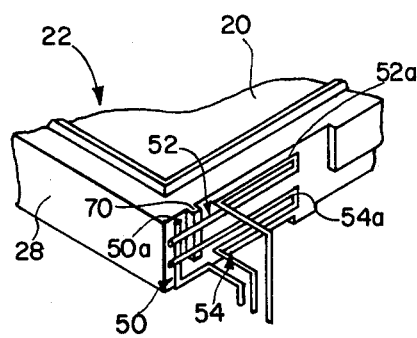
FIG. 3 is an enlarged fragmentary perspective view illustrating one condition of cooperation between coding structure on the film pack and the switching arrangement of this invention.
Figure 4:
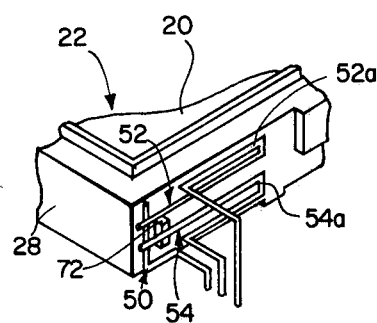
FIG. 4 is similar to FIG. 3, but illustrating another condition of such cooperation.
Figure 5:
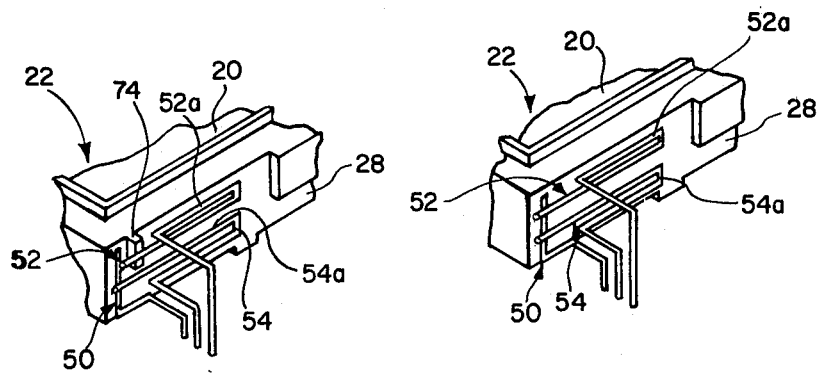
FIG. 5 is similar to FIGS. 3 and 4, but illustrating yet another condition of such cooperation.
Figure 6:
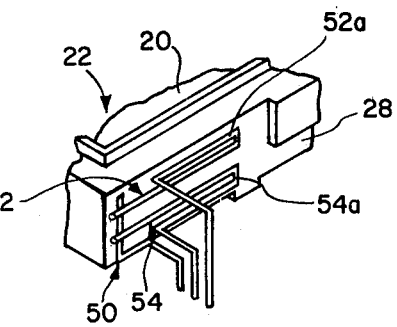
FIG. 6 is a view similar to FIGS. 3–5, but illustrating yet another condition of such cooperation.

Assuming for purposes of clarity that the AND gates 56–62 themselves do not provide an inversion, it can be seen that each will respectively provide a high or positive output only when a particular sensing state exists as designated in FIGS. 3–6. Thus AND gate 56, coupled directly to both the sensing members 52 and 54, only provides a positive output when both of these members are at V+, or that is when both the sensing members are closed (FIG. 6). Conversely, the AND gate 58 is coupled to the sensing members 52 and 54 through the inverters 64 and 66. Hence, it only provides a positive output when both the sensing members 52 and 54 are open (FIG. 3). Since the AND gate 60 is coupled to the inverse of the sensing member 52 and directly to the sensing member 54, it will provide a positive value V+ only when the sensing member 52 is open and the sensing member 54 closed. Similarly, since the AND gate 62 is coupled directly to the sensing member 52 and to the inverse of the sensing member 54, it provides a positive output only when the sensing member 52 is closed and the sensing member 54 is open.

In the above, for clarity, it was assumed that the AND gates 56–62 do not themselves invert the signal; however, it should be understood that where such inversion does occur, the exposure control circuit 68 can be made to operate on the low or negative signal, or all of the gate inputs of outputs can be inverted.

Thus, at any given time, depending upon the state of the sensing members 52 and 54, the exposure control circuit 68 will receive one high or positive signal, which controls its operational state, and three low or negative signals which are ineffective to control the unit. In regard to the latter, the exposure control unit 68 may provide a different trip level in the capacitor charging circuit (not shown) of a light integrating network forming part of the light detecting station for each of the control values represented by the noted four operational states so as to accordingly vary the exposure interval with film speed of the film contained within each film pack container.

To better understand operation of the present invention, reference is again made to FIGS. 3-6.

For effecting the conjoint and/or independent opening and closing of the sensing members 52 and 54 between the multiplicity of operational states in the manner indicated, the film pack housings contemplated for use within the camera have differently sized and positioned coding arrangements or tactile discontinuities carried thereon, which are representative of film characteristics, such as film speed. As is best shown in FIG. 1, the sensing members 52, 54 are positioned rearwardly in the film pack receiving chamber.

Normally, both the sensing members 52, 54 are in their closed condition, whereby the AND gate 56 controls operation of the exposure control unit 68. One of the film pack container housings 28 intended to be used has no film coding protrusion. In this regard, see FIG. 6. However, it will be understood that the absence of such protrusion is indicative of film speed and is nonetheless effective for affecting the exposure control unit 68 and for ultimately affecting exposure control by altering the trip level in the capacitor charging circuit.

For instance, in FIGS. 1 and 3 the back wall of the housing 28 is provided with a vertical protrusion 70 which is shaped and sized to force both the sensing members 52 and 54 to their nonconducting states (i.e. opened). It will be appreciated that when this occurs the AND gate 58 is operative to input the exposure control network 68. Of course, the size of the protrusion 70 is indicative of the film speed. By operating the sensing arrangement 48 in the manner indicated, a different capacitive value in the charging circuit is reached to thereby alter operation of the exposure control cycle in a manner consistent with the sensitivity of the film carried in the container.

Now referring to FIG. 4, it will be noted that protrusion 72, which is representative of another film speed, is effective upon insertion of the housing 28 into the camera housing 12 for raising the sensing member 54 from the common sensing element 50 while, of course, leaving the sensing member 52 in contact with the common sensing element. As explained earlier, when this condition of sensing states occurs, the AND gate 62 is operative for controlling the operation of the exposure control circuit 68 and thereby exposure so as to be consistent with the film speed.

In connection with FIG. 5, a protrusion 74 is formed on the back wall of the film pack container housing 28. This protrusion is indicative of yet another film speed. Upon insertion of the housing 28 into the chamber, the protrusion 74 is effective to raise the sensing member 52 from the common sensing element 50, while leaving the member 54 in contact with the element 50. As explained earlier, when this condition of sensing occurs, it effects operation of the AND gate 60 which, in turn, operates the exposure control circuit 68 for changing the capacitive value in the charging circuit so as to ultimately effect the exposure control cycle consistent with the film speed of the film contained in that particular container. It will be understood, of course, that the protrusions 72, 74 are roughtly one-half the dimension of the protrusion 70 and are spaced so that both the tangs 52a, 54a will not be contacted by just one of the protrusions 72, 74.

From the above, it is apparent that an improved sensing means makes provision for a plurality of sensing arrangements operable between different sensing states which number of states is in excess of the number of sensing arrangements responsive to different coding arrangements on respectively different film containers. Moreover, it is compact and reliable and is able to accommodate for dimensional errors of the tactile discontinuities.

Since certain changes may be made in the abovedescribed apparatus without departing from the scope of the invention herein involved, it is intended that all matter contained in the description or shown in the accompanying drawings shall be interpreted as illustrative and not in a limiting sense.

What is claimed is:

1. In a photographic apparatus having means operable for effecting a photographic function, means for defining a receiving chamber capable of removably receiving one of a plurality of selectively dimensioned film containers, means associated with said chamber for sensing different coding arrangements carried on the containers, the coding arrangement being indicative of a particular characteristic of the film contained within the container, and means responsive to said sensing means for controlling said operable means so as to effect a select photographic function corresponding to the characteristic of the film, the improvement wherein:

said sensing means includes a plurality of sensing arrangements operable between different sensing states, which number of states is in excess of the number of sensing arrangements, responsive to different coding arrangements on respectively different film containers; and said sensing arrangements include a stationary switching member and a pair of movable switching members, each of said movable switching members being independently movable into and out of engagement with said stationary switching member so that individually each of said movable switching members has two states of operation and collectively provide four states of operation, and said means for controlling said operable means includes means for indentifying each of said four states and altering said photographic function in accordance therewith.

2. The apparatus of claim 1 wherein the film containers include coding means comprising a tactile discontinuity indicative of a film characteristic of film contained therein, and said movable members are arranged for cooperation with said discontinuity so as to cause movement or nonmovement of one or both of said movable switching members with respect to said stationary member.

3. The apparatus of claim 2 wherein the coding arrangement of the film container includes an elongated discontinuity located on a given surface of the film container, and said movable switching members are located in said receiving chambers so as to be cooperatively engaged by the elongated discontinuity when the film container is properly positioned therein, said movable switching members being arranged such that each one-half of the length of the discontinuity effects the state of one of the movable members respectively.

4. The apparatus of claim 1 wherein the coding arrangement of the film container includes a raised elongated portion located on a given surface of the film container, and said movable switching members are located in said receiving chamber so as to be cooperatively engaged by said raised portion when the film container is properly positioned therein, said movable switching members being biased into engagement with said stationary switching and engaged to be disengaged therefrom by said raised portion of the container such that each one-half of the length of the raised portion disengages one of the movable members respectively whereby the lack of a given one-half of the raised portion permits engagement of its associated movable member.

5. The apparatus of claim 4 wherein the raised portion is located on an elongated surface of the container with the raised surface traverses the longitudinal axis thereof, said stationary member is arranged in said chamber to be traverse this container axis, and said movable members are arranged parallel to this container axis in overlying relation to the location of the raised portion.

6. In a photographic apparatus having means operable for effecting a photographic function, means for defining a receiving chamber capable of removably receiving one of a plurality of selectively dimensioned film containers, means associated with said chamber for sensing different coding arrangements carried on the containers, the coding arrangement being indicative of a particular characteristic of the film contained within the container, and means responsive to said sensing means for controlling said operable means so as to effect a select photographic function corresponding to the characteristic of the film, the improvement wherein:

said sensing means includes a plurality of sensing arrangements operable between different sensing states, which number of states is in excess of the number of sensing arrangements, responsive to different coding arrangements on respectively different film containers;

said sensing arrangements include a stationary switching member and a plurality of movable switching members, each of said movable switching members being independently movable into and out of engagement with said stationary switching member so that individually each of said movable switching members has two states of operation and collectively provide a multiple number of states of operation, which multiple number is a function of the product of the number of switching members and their respective switching states, and said means for controlling said operable means includes means for identifying each of said states and altering said photographic function in accordance therewith.

7. The apparatus of claim 6 wherein the film containers include coding means comprising a tactile discontinuity indicative of a film characteristic of film contained therein, and said movable members are arranged for cooperation with said discontinuity so as to cause movement or nonmovement of one or both of said movable switching members with respect to said stationary member.

* * * * *